US012096170B2

(12) United States Patent
Rombach et al.

(10) Patent No.: US 12,096,170 B2
(45) Date of Patent: Sep. 17, 2024

(54) MICROPHONE COMPONENT AND METHOD FOR FABRICATING MICROPHONE COMPONENT

(71) Applicant: TDK Corporation, Tokyo (JP)

(72) Inventors: Pirmin Hermann Otto Rombach, Kongens Lyngby (DK); Dennis Mortensen, Bagsvard (DK)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 18/328,311

(22) Filed: Jun. 2, 2023

(65) Prior Publication Data

US 2023/0308792 A1 Sep. 28, 2023

Related U.S. Application Data

(62) Division of application No. 17/206,297, filed on Mar. 19, 2021, now Pat. No. 11,736,845.

(30) Foreign Application Priority Data

Mar. 27, 2020 (DE) ......................... 102020108527.3

(51) Int. Cl.
*H04R 1/08* (2006.01)

(52) U.S. Cl.
CPC ......... *H04R 1/08* (2013.01); *H04R 2201/003* (2013.01)

(58) Field of Classification Search
CPC ........ H04R 1/08; H04R 31/00; H04R 19/005; H04R 2201/003
See application file for complete search history.

(56) References Cited

U.S. PATENT DOCUMENTS

| | | | | |
|---|---|---|---|---|
| 2013/0223654 | A1 | 8/2013 | Dehe et al. | |
| 2014/0307909 | A1* | 10/2014 | Yang | H04R 19/04 381/369 |
| 2015/0175404 | A1 | 6/2015 | Jenkins et al. | |
| 2017/0230757 | A1 | 8/2017 | Kuntzman et al. | |
| 2021/0067882 | A1 | 3/2021 | Rombach | |
| 2021/0136483 | A1 | 5/2021 | Hsieh et al. | |

FOREIGN PATENT DOCUMENTS

| | | | |
|---|---|---|---|
| DE | 102019123077 | A1 | 3/2021 |
| EP | 2519030 | A1 | 10/2012 |

OTHER PUBLICATIONS

Inoue Tadashi, et al., "Study and development of low-noise MEMS acoustic sensors," Important considerations for air damping and process stability, Omron Technics, vol. 50.012EN, Mar. 2019, 7 pages.

* cited by examiner

*Primary Examiner* — Tuan D Nguyen
(74) *Attorney, Agent, or Firm* — Slater Matsil, LLP

(57) ABSTRACT

A microphone component and a method for fabricating a microphone component are disclosed. In an embodiment, a method includes fabricating a microphone component having a backplate and a membrane in a MEMS technology, forming a plurality of holes in the membrane, the holes having diameters smaller than 5 μm, choosing a value for a low frequency roll-off and a diameter of the holes in the membrane and choosing a number of holes such that the chosen value for low frequency roll-off is achieved.

15 Claims, 3 Drawing Sheets

MICROPHONE COMPONENT AND METHOD FOR FABRICATING MICROPHONE COMPONENT

CROSS-REFERENCE TO RELATED APPLICATIONS

This application is a divisional application of U.S. application Ser. No. 17/206,297, which was filed on Mar. 19, 2021, which claims priority to German Patent Application No. 102020108527.3, filed on Mar. 27, 2020, which applications are hereby incorporated herein by reference.

TECHNICAL FIELD

The present invention is directed to a microphone component, in particular a MEMS (micro-electrical-mechanical systems) microphone component. In particular, the microphone component comprises a membrane for receiving an acoustical input signal. Such a microphone component may be used in a microphone for a headset, for example.

BACKGROUND

MEMS microphones may be exposed to extreme air pressure during component assembly into telephones, but also during operation. As an example, levels of 7 bar overpressure might appear at the membrane. Such high pressures may lead to damage of the membrane and/or the backplate. Therefore, a high level of robustness against high air pressure is required.

The problem of overpressure can be addressed by reducing the pressure drop over the membrane by equalizing the pressure between front volume and back volume of the microphone fast enough to keep the pressure drop low. US 2013/0223654 A1 discloses adjustable ventilation openings in an outer region of the membrane. US 2017 230 757 A1 discloses a microphone wherein a membrane comprises a single central vent hole for providing air pressure equalization between a front volume and a back volume of the microphone. Multiple, smaller vent holes may serve a dual function as release holes to help the oxide etchant enter the gap and free the structure at the end of the MEMS die fabrication process.

However, while opening up ventilation channels during fast ramps or providing a central hole in the membrane enables reducing the pressure drop, the accuracy for the LFRO (low frequency roll-off) for high acoustical signals is diminished.

SUMMARY

Embodiments provide an improved microphone component.

In one embodiment, the present disclosure relates to a microphone component comprising a membrane and a backplate, in particular a MEMS microphone component. The microphone component may function as a condenser, wherein a first capacitor plate is formed by the membrane and a second capacitor plate is formed by the backplate. A bias voltage may be applied to the membrane or backplate. A deflection of the membrane due to acoustic pressure changes the capacitance between the membrane and backplate, resulting in an electric output signal. The microphone component can be connected to an electric signal processing circuit, such as an ASIC.

The microphone component can be manufactured in MEMS technology. In particular, for producing the membrane and the backplate, an etching process can be used. The microphone component may have a single-membrane design. Accordingly, the microphone component and the resulting microphone comprise only a single membrane for generating an electric output signal from an acoustic input signal. The membrane and the backplate may be supported on a substrate. The membrane may be located on the acoustic input side of the microphone and the backplate may be located on top of the membrane with a gap to the membrane. It is also possible that the microphone component has a single-membrane and double-backplate design. In this case, the single membrane may be located between two backplates.

The membrane comprises a plurality of holes. The diameter of the holes is smaller than 5 μm. In specific embodiments, the diameters of the holes are equal or smaller than 2 μm.

Holes with such small diameters enable fast pressure equalization at high pressure loads. In particular, the flow resistance of a small hole exhibits a smaller increase with rising pressure drop than the flow resistance of a hole with a larger diameter. This can be explained by the less turbulent behavior of air flow through a small hole. Thus, providing many small ventilation holes instead of one or a few larger ventilation holes has the advantage that the pressure drop between front volume and back volume can be equalized faster for high pressure drops. This improves the robustness of the microphone component at exposure to high pressure.

The holes may additionally or alternatively enable access for the etchant during later removal of the sacrificial layer. Due to the small size of the holes no particles larger than the hole diameter can enter the microphone after production.

The number of holes in the membrane may be at least 100. The number of holes may be several hundred or several thousands.

The high number of small holes enables fast pressure equalization at mediate and also at high overpressure.

In addition to that, the high number of small holes enables keeping the LFRO at the same level as for a membrane with a few or a single larger hole.

As an example, the number and diameters of holes is adjusted such that a pre-set value of low-frequency roll-off is achieved. The diameter of the vent hole affects the low-frequency performance of the microphone, so that the resistance of the vent hole and the capacitance of the cavity act as a low-frequency cut-off filter. As an example, the diameters of the holes may be set to a specific value, such as a minimum value which can be fabricated by technologies such as reactive ion etching. The number of holes is chosen such that the pre-set value of low-frequency roll-off is achieved.

All holes in the membrane may have the same diameter. In some embodiments, the membrane may comprise holes of different diameters. As an example, first holes of a first diameter smaller than 5 μm may be provided as holes for enabling pressure equalization. In addition to that, second holes of a second diameter smaller than 5 μm, but larger than the first holes may be provided primarily as release holes to help the oxide etchant enter the gap and free the structure at the end of the MEMS die fabrication process. The number of first holes may be larger than the number of second holes. The number of second holes is such that the second holes do not interfere with the function of the first holes.

In an embodiment, the holes may be distributed over the whole or almost the whole membrane area. In particular, the holes may be equally distributed over the membrane area. A support region for supporting the membrane on a substrate may be free from any holes.

In some embodiments, regions of the membrane undergoing the largest mechanical stress at high pressure loads may be free from any holes. As an example, a region directly adjoining the support region may be free from any holes. This region may extend from the support region to a distance of at least 20 μm from the support region. In some embodiments, the distance may be in a range of 50 μm to 100 μm, for example.

Alternatively or additionally, a central region of the membrane may be free from any holes. Alternatively, the number of holes per surface area in the central region is less than the number of holes per surface area in a region outside the central region.

Providing a central region free from holes or a central region with fewer holes has the advantage that a pressure pulse can be dissipated over a bigger membrane surface area before reaching the smaller holes to vent the air.

The size of the central region may depend on the anticipated frequency response and the pressure pulse affecting this region. As an example, the central region may have a radius of 1/10 or 1/5 or even larger of the overall radius of the deformable membrane area.

The holes may be located within a circular ring region of the membrane. The circular ring region may be defined by a first radius and a second radius. The number of holes per surface area outside the ring region may be less than the number of holes per surface area in the circular ring region or the number of holes outside the ring region may be free from any holes.

The region in which the holes are located may have a different geometric shape than a circular ring. In particular, the shape may depend on the shape of the membrane. As an example, the membrane may have a rectangular or oval shape. In this case, the region in which the holes are located may have a frame-like shape with a rectangular or oval geometry.

The backplate may comprise further holes. The further holes may have a diameter of about 5 μm to 20 μm. The further holes serve to reduce the acoustic resistance of the component. The further holes may be large compared to the holes in the membrane. As an example, the diameter of the further holes in the backplate may be at least twice the diameter of the holes in the membrane.

The holes in the membrane may be positioned within the backplate holes in a top view on the backplate. This has the technical effect that the holes in the backplate do not lead to a change of the acoustic resistance of the membrane ventilation holes.

The number of further holes in the backplate may be larger than the number of holes in the membrane. As an example, the further holes in the backplate may be positioned also in regions in which the membrane is free from any holes or has a smaller amount of holes.

A further embodiment, the present disclosure relates to a method for fabricating the microphone component described in the foregoing. In particular, the microphone component comprises a plurality of holes having diameters smaller than 5 μm.

In the method, a value for low frequency roll-off is chosen and a diameter of the holes in the membrane is chosen. The number of holes is chosen such that the chosen value for low frequency roll-off or cut-off is achieved in the microphone component. As an example, the diameter of the holes may be chosen as small as possible in order to keep the resistance over the hole constant also for high pressure. The number of holes may be adjusted to achieve the desired characteristics. The required number of holes may be determined by a simulation tool or by testing.

As an example, the holes may be introduced in the membrane by an etching process, such as reactive ion etching.

BRIEF DESCRIPTION OF THE DRAWINGS

The present disclosure comprises several embodiments of an invention. Every feature described with respect to one of the embodiment is also disclosed herein with respect to the other embodiment, even if the respective feature is not explicitly mentioned in the context of the specific embodiment.

Further features, refinements and expediencies become apparent from the following description of the exemplary embodiments in connection with the figures.

In the figures, elements of the same structure and/or functionality may be referenced by the same reference numerals. It is to be understood that the embodiments shown in the figures are illustrative representations and are not necessarily drawn to scale.

DETAILED DESCRIPTION OF ILLUSTRATIVE EMBODIMENTS

Figure 1A:
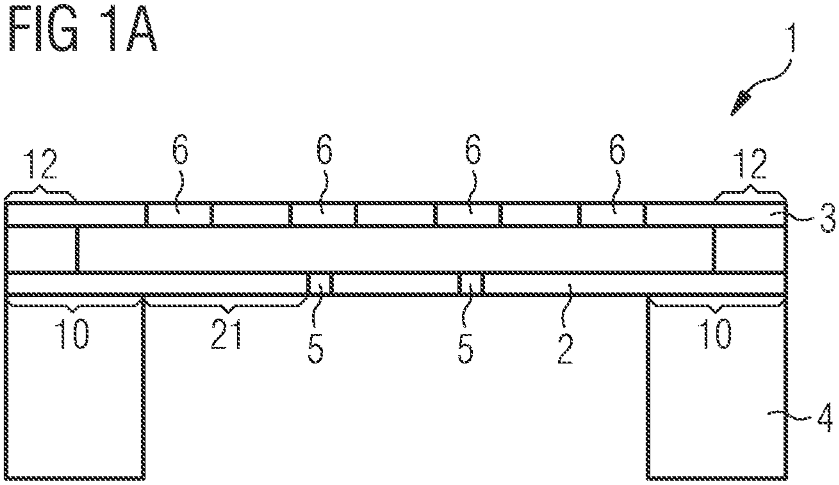
FIG. 1A shows an embodiment of a microphone component in a longitudinal cut.

FIG. 1A schematically shows an embodiment of a microphone component 1, in particular a MEMS microphone component.

The microphone component 1 comprises a deformable membrane 2 for receiving an acoustical input signal. The component 1 further comprises a backplate 3. The membrane 2 functions as a movable electrode and the backplate 3 functions as a counter-electrode, in particular as a non-deformable, stiff counter-electrode. The membrane 2 and the backplate 3 are supported on a substrate 4. In particular, the membrane 2 has a support region 10 which is fixed on the substrate 4. The backplate 3 has a further support region 12 which is fixed on the substrate 4 via insulating portions and the membrane 2.

A bias voltage may be applied between the membrane 2 and the backplate 3. When the membrane 2 deflects under an acoustical input signal, the capacitance between the membrane 2 and the backplate 3 changes, resulting in an electrical output signal. Accordingly, the membrane 2 and the backplate 3 function as a transducer for converting an acoustical input signal into an electrical signal. A microphone may comprise the microphone component 1, in particular a MEMS die, and an electronic circuit for processing an electric signal, in particular an ASIC die.

The membrane 2 comprises a plurality of holes 5. The holes 5 may have diameters of smaller than 5 μm. As an example, the holes 5 may have diameters equal or smaller than 2 μm. Also diameters of 1.5 μm and as small as 0.5 μm or even smaller are possible. All holes 5 may have the same diameter. The number of holes in the membrane may be several hundreds or several thousands, for example.

By such small ventilations holes 5 the flow resistance may be kept constant even for high pressure gradients. In contrast to that, large ventilation holes 5 have an increasing resistance with increasing pressure gradients. The increasing resistance may arise due to the generation of turbulences at the hole at high air flow. Accordingly, large ventilation holes 5 may not allow fast equalization of the pressure between front volume and back volume (see also FIG. 3 and description thereof).

The backplate 3 comprises further holes 6, which may be provided for decreasing the acoustic resistance of the microphone component 1. The further holes 6 are larger than the holes 5 in the membrane. As an example, the further holes 6 may have diameters of 5 to 20 μm. The holes 5 in the membrane 2 may have diameters of at most half of the diameters of the further holes 6 in the backplate 3.

The holes 5 and further holes 6 shown in FIG. 1A are only conceptual. The number of holes 5 and further holes 6 may be significantly higher.

Figure 1B:
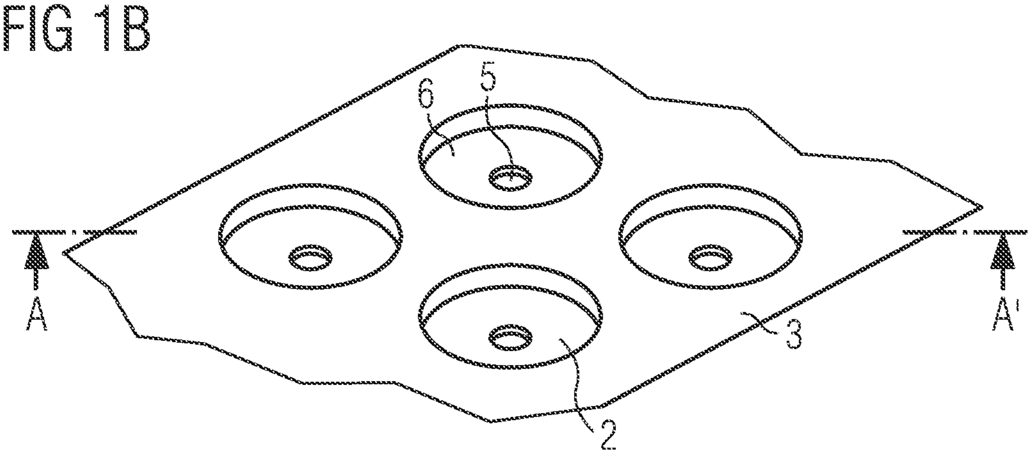
FIG. 1B shows a section of the backplate of the microphone of FIG. 1 in a perspective view from the backside.

FIG. 1B shows a part of the backplate 3 of the microphone component 1 of FIG. 1 in a perspective view on top of the backplate 3. The position of the sectional cut shown in FIG. 1A is indicated by the line A-A'.

As clearly visible in FIG. 1B, the holes 5 in the membrane 2 may be configured to be positioned laterally centred to the further holes 6 in the backplate 3. The membrane 2 may have as many holes as the backplate 3. The membrane 2 may have a smaller amount of holes than the backplate 3.

Figure 2A:
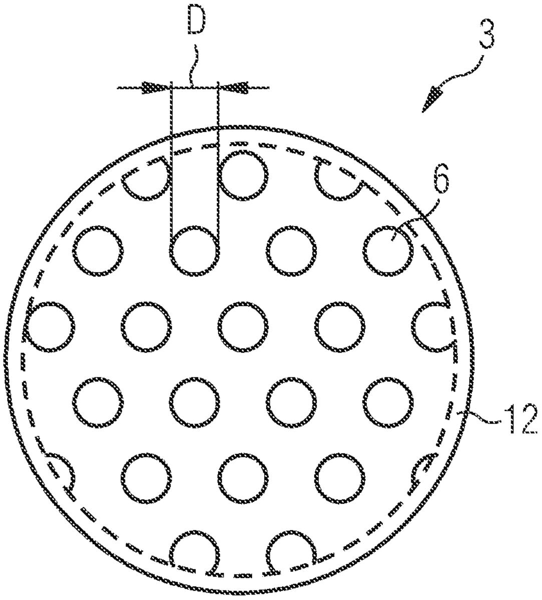
FIG. 2A shows a backplate of an embodiment of a microphone component in a top view.
Figure 2B:
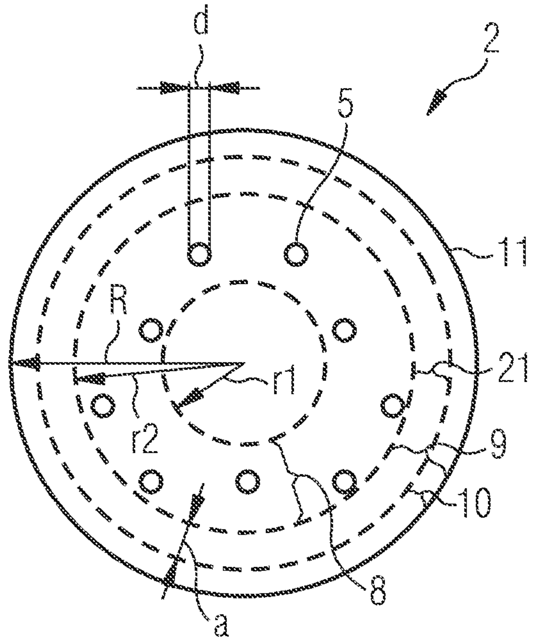
FIG. 2B shows a membrane of the embodiment of the microphone component with the backplate of FIG. 2A.

FIG. 2A shows a backplate 3 and FIG. 2B shows a membrane 2 of an embodiment of a microphone component. The microphone component may be the microphone component 1 of FIGS. 1A and 1B. As can be seen in FIG. 2A, the backplate 3 has a plurality of holes 6. The holes 6 may be distributed equally over the entire area of the backplate 3.

A support region 12 on which the backplate 3 is supported on the substrate may be free from any holes. As the backplate 3 does not undergo a significant deformation and shows no significant mechanical stress, the holes in the backplate 3 may be positioned also in an area directly adjoining the support region 12.

As can be seen in FIG. 2B, the holes 5 in the membrane 2 are located within a circular ring region 8 defined by an inner radius r1 and an outer radius r2. The holes 5 are equally distributed within the circular ring region 8. An outer region 9 which directly adjoins the circular ring region 8 and extends to the very edge ii of the membrane 2 is free from any holes 5.

The outer region 9 comprises the support region 10 on which the membrane 2 is supported on the substrate 4 and comprises an additional clearance region 21. Accordingly, the holes 5 are located at a distance a from the support region 10. The distance a may be at least 20 μm, for example. The distance a may be between 50 and 100 μm, for example. The clearance region 21 is a region in which high mechanical stress may occur during the deflection of the membrane 2 and is, therefore, kept free from the holes 5.

Figure 3:
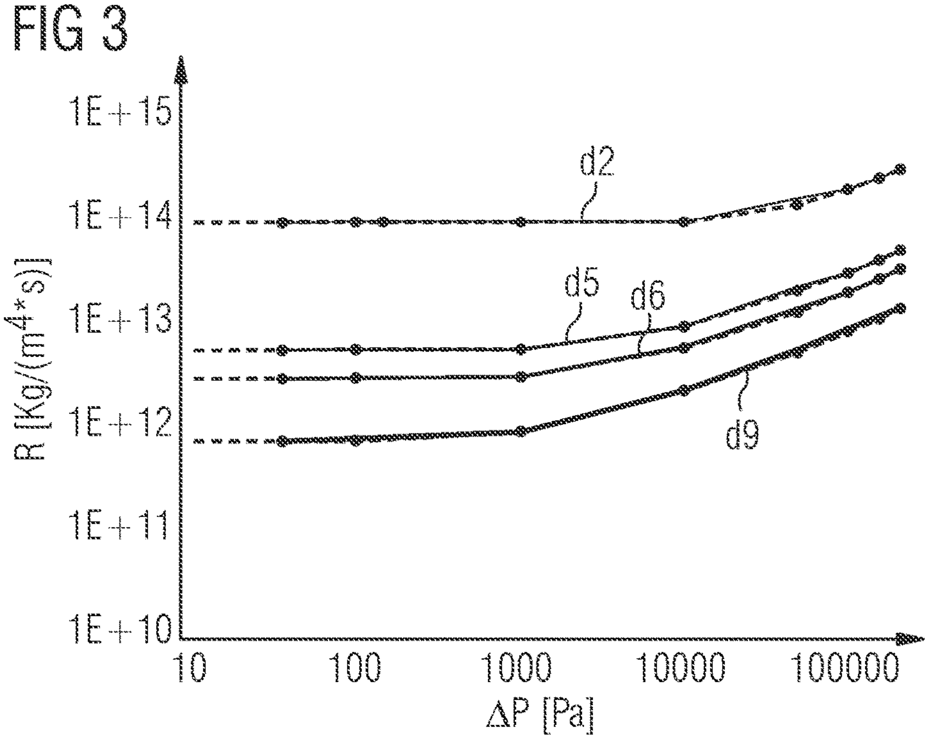
FIG. 3 shows a diagram of flow resistance over pressure drop for various hole diameters in a membrane.

FIG. 3 shows a diagram of flow resistance R per hole 5 of the membrane 2 over pressure drop ΔP between front and back volume. The pressure drop ΔP is the difference between pressure in the front volume and back volume, i.e., the pressure gradient.

The different curves d2, d5, d6, d9 show results for holes 5 in the membrane 2 having diameters d of:

d2: approximately 2 μm; exactly 1.88 μm
d5: approximately 5 μm; exactly 4.6 μm
d6: approximately 6 μm; exactly 5.72 μm
d9: approximately 9 μm; exactly 9 μm.

The dashed lines and solid lines result from two different simulation methods. As can be clearly seen, the flow resistance R is larger for smaller holes but remains at a more constant level with increasing pressure drop as compared to larger holes. An increase of the flow resistance R for a fixed hole diameter d can be explained by turbulent behaviour at an increased pressure drop ΔP. However, smaller holes 5 show less turbulent behaviour of the air flow and, therefore, a smaller increase of the flow resistance R with increasing pressure.

Figure 4:
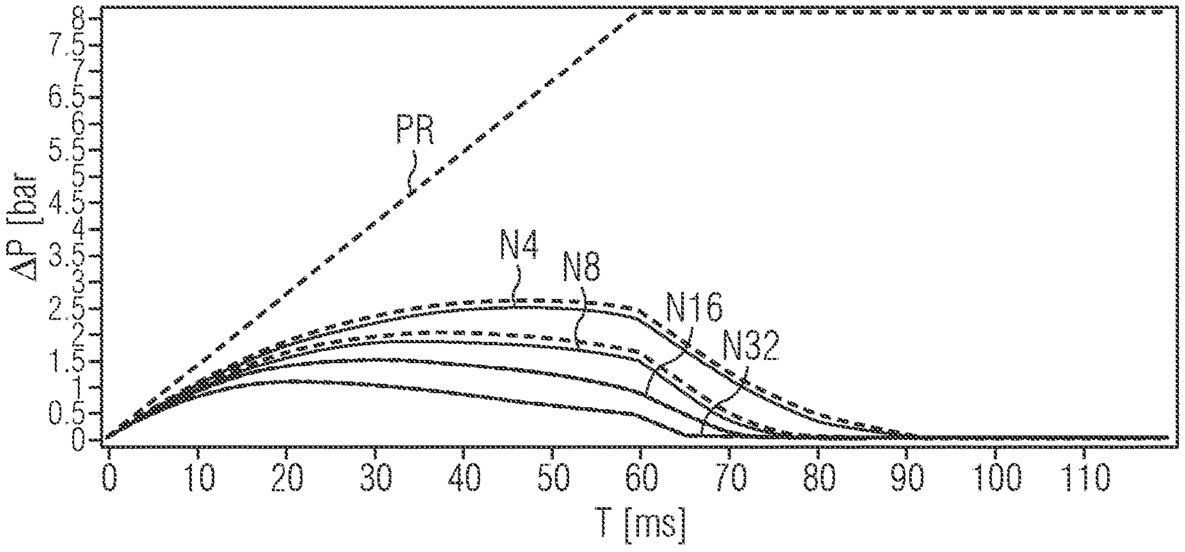
FIG. 4 shows a diagram of pressure drop versus time for various amounts of ventilations holes with different diameters in a membrane.

FIG. 4 shows a diagram of pressure drop ΔP over time T over membranes 2 having different amounts N and sizes of holes 5 when applying an increasing pressure drop ΔP up to a maximum level. Accordingly, a pressure ramp PR is driven.

The dashed lines and solid lines result from two different simulation methods. In particular, the solid lines result from a 3D FEM (finite element method) model and the dashed lines from a 2D FEM model.

For different numbers of holes 5 the diameters d are set such that the low frequency roll-off (LFRO) is constant. In the present case, the LFRO may be set to 35 Hz. It is also possible that a diameter d of the holes 5 is chosen and that the number N of holes 5 is set such that the low frequency roll-off (LFRO) is constant. Generally, the diameter and number of holes determine the overall resistance of the vent holes 5. When the overall resistance is decreased, the roll-off is shifted to a smaller frequency.

In a method of fabricating a microphone component 1, a minimum diameter d of holes 5 may be defined by the used technology. The holes 5 may be introduced in the membrane 2 by an etching process, such as reactive ion etching. Given the minimum diameter d of holes 5, the number N of holes 5 is chosen such that a specific LFRO is achieved.

The different curves N4, N8, N16, N32 show results for the following number of holes and the following diameters of each of the holes:

N4: 4 holes; diameter 7.2 μm
N8: 8 holes; diameter 5.7 μm
N16: 16 holes; diameter 4.6 μm
N32: 32 holes; diameter 3.6 μm As can be seen in FIG. 4, the curves are overall flatter with an increasing number N and a decreasing diameter d of the holes. The pressure drop ΔP also reaches faster a zero value with an increasing number N and a decreasing diameter d of the holes. Overall, the pressure between front volume and back volume equalizes faster with an increasing amount of holes.

The number of holes may depend on the size of the back volume. In particular, with a larger back volume more holes may be required for achieving pressure equalisation in the same time as for a smaller back volume.

In sum, the holes may be designed as small as possible in order to keep their flow resistance constant for high pressure drops. The number of holes is chosen such that a low tolerance for the low frequency roll-off (LFRO) of the microphone is achieved.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:

fabricating a microphone component comprising a backplate and a membrane in a MEMS technology;

forming a plurality of holes in the membrane, the holes having diameters smaller than 5 μm;

choosing a first value for a low frequency roll-off and a second value for an allowed increase of a flow resistance with increasing pressure:

choosing a diameter of the holes in the membrane such that an increase of flow resistance with increasing pressure is below the second value; and choosing a number of holes such that the first value for the low frequency roll-off is achieved.

2. The method of claim 1, wherein the diameters are equal or smaller than 2 μm.

3. The method of claim 1, wherein the number of the holes formed in the membrane is at least 100.

4. The method of claim 1, wherein the membrane has a support region, in which the membrane is supported by a substrate, and a clearance region extending by at least 20 μm from the support region, and wherein the clearance region is free from any holes.

5. The method of claim 1, wherein the backplate comprises further holes, wherein the holes in the membrane are positioned within the further holes of the backplate in a view on the backplate.

6. The method of claim 5, wherein the further holes in the backplate are formed to have larger diameters than the holes in the membrane.

7. The method of claim 5, wherein a number of the further holes in the backplate is larger than the number of the holes in the membrane.

8. The method of claim 1, wherein the microphone component has a single-membrane design.

9. The method of claim 1, wherein the holes are at least formed in a central region of the membrane.

10. The method of claim 9, wherein the holes are formed to be equally distributed in the central region of the membrane.

11. The method of claim 1, wherein the membrane has a central region having a first radius, and wherein a number of holes per surface area formed in the central region is less than a number of holes per surface area formed in a region adjoining the central region or wherein the central region is free from any holes.

12. The method of claim 1, wherein the holes are positioned within a circular ring region of the membrane, the circular ring region being defined by a first radius and a second radius, and wherein a number of holes per surface area outside the circular ring region is less than a number of holes per surface area within the circular ring region or wherein regions outside the circular ring region are free from any holes.

13. The method of claim 1, wherein the holes are formed to be equally distributed in a central region of the membrane.

14. A method comprising:

fabricating a microphone component comprising a backplate and a membrane in a MEMS technology;

forming a plurality of holes in the membrane, wherein the holes have diameters smaller than 5 μm, wherein the holes comprise first holes of a first diameter smaller than 5 μm and second holes of a second diameter smaller than 5 μm, but larger than the first holes, and wherein the first holes are configured for providing pressure equalization and the second holes are configured as release holes for etching;

choosing a value for a low frequency roll-off and a diameter of the first and second holes in the membrane; and choosing a number of first holes such that the value for low frequency roll-off is achieved.

15. A method comprising:

fabricating a microphone component comprising a backplate and a membrane in a MEMS technology;

forming a plurality of holes in the membrane, the holes having diameters smaller than 5 μm;

choosing a value for a low frequency roll-off and a diameter of the holes in the membrane; and choosing a number of holes such that a chosen value for the low frequency roll-off is achieved, wherein the membrane has a central region having a first radius, and wherein a number of holes per surface area formed in the central region is less than a number of holes per surface area formed in a region adjoining the central region or wherein the central region is free from any holes.

* * * * *